(12) United States Patent
Briosi

(10) Patent No.: US 11,103,061 B2
(45) Date of Patent: Aug. 31, 2021

(54) MODULAR FRAMEWORK FOR SHELVING

(71) Applicant: Antonello Briosi, Rovereto (IT)

(72) Inventor: Antonello Briosi, Rovereto (IT)

(*) Notice: Subject to any disclaimer, the term of this patent is extended or adjusted under 35 U.S.C. 154(b) by 0 days.

(21) Appl. No.: 16/753,321

(22) PCT Filed: Nov. 23, 2018

(86) PCT No.: PCT/IB2018/059251
§ 371 (c)(1),
(2) Date: Apr. 2, 2020

(87) PCT Pub. No.: WO2019/102405
PCT Pub. Date: May 31, 2019

(65) Prior Publication Data
US 2020/0275774 A1 Sep. 3, 2020

(30) Foreign Application Priority Data

Nov. 24, 2017 (IT) .................. 102017000135473

(51) Int. Cl.
*A47B 53/02* (2006.01)
*F16H 1/20* (2006.01)
*F16H 19/02* (2006.01)
*F16H 57/02* (2012.01)

(52) U.S. Cl.
CPC ............ *A47B 53/02* (2013.01); *F16H 1/20* (2013.01); *F16H 19/02* (2013.01); *F16H 57/02* (2013.01)

(58) Field of Classification Search
CPC .......... A47B 53/02; A47B 53/00; F16H 1/20; F16H 19/02; F16H 57/02; A47F 5/0093; A47F 5/0081; A47F 3/08

USPC ....... 211/162, 151, 1.51, 1.57; 312/198–201, 312/131, 132, 249.8, 249.13, 249.1; 52/36.1, 36.5; 280/9.3, 79.3; 104/62

See application file for complete search history.

(56) References Cited

U.S. PATENT DOCUMENTS

| 609,881 A * | 8/1898 | Flesher .................. B61D 15/10 105/88 |
| 3,055,313 A * | 9/1962 | Stoll ....................... A47B 53/02 104/162 |
| 3,123,829 A * | 3/1964 | Bronson ................ A47B 81/04 108/136 |

(Continued)

FOREIGN PATENT DOCUMENTS

| EP | 0985368 A1 | 3/2000 |
| FR | 2143996 A5 | 2/1973 |
| WO | 2015157793 A1 | 10/2015 |

*Primary Examiner* — Jennifer E. Novosad
(74) *Attorney, Agent, or Firm* — David B. Tingey; Bryant J. Keller; Kirton McConkie

(57) ABSTRACT

In some cases, the described system includes: a supporting frame of a shelving; a movement mechanism that is configured to move the supporting frame forward and backward on a guide that includes a direction of movement; an actuating mechanism that is configured to actuate the movement mechanism which is associated with the supporting frame; and a transmission mechanism that is configured to transmit motion from the actuating mechanism to the movement mechanism, and that is associated with the supporting frame; wherein the transmission mechanism includes a driving gear wheel associated with the actuating mechanism and a driven gear wheel cooperating with the driving gear wheel and associated with the movement mechanism.

8 Claims, 3 Drawing Sheets

(56) References Cited

U.S. PATENT DOCUMENTS

| | | | | | |
|---|---|---|---|---|---|
| 3,162,144 | A | * | 12/1964 | Ingold | A47B 53/02 104/162 |
| 3,186,355 | A | * | 6/1965 | Stoll | A47B 53/02 104/162 |
| 3,640,595 | A | * | 2/1972 | Staller | A47B 53/02 312/198 |
| 3,923,354 | A | * | 12/1975 | Young | A47B 53/02 312/201 |
| 3,944,309 | A | * | 3/1976 | Taniwaki | A47B 53/02 104/287 |
| 4,138,173 | A | * | 2/1979 | Taniwaki | A47B 53/02 292/170 |
| 4,256,355 | A | * | 3/1981 | Yamaguchi | A47B 53/02 104/287 |
| 4,417,524 | A | * | 11/1983 | Quinn | A47B 53/02 104/287 |
| 4,421,365 | A | * | 12/1983 | Taniwaki | A47B 53/02 104/287 |
| 4,467,924 | A | * | 8/1984 | Morcheles | A47B 53/02 104/287 |
| 4,527,680 | A | * | 7/1985 | Sato | A47B 53/02 188/69 |
| 4,559,027 | A | * | 12/1985 | Sattel | F16H 7/14 312/199 |
| 4,969,403 | A | * | 11/1990 | Schwartz | A47B 5/00 108/147 |
| 5,007,351 | A | * | 4/1991 | Muth | A47B 53/02 104/287 |
| 5,058,507 | A | * | 10/1991 | Muth | F16H 7/08 105/105 |
| 5,160,189 | A | * | 11/1992 | Johnston | A47B 53/00 188/82.2 |
| 5,360,262 | A | * | 11/1994 | Davidian | A47B 53/02 312/201 |
| 5,401,090 | A | * | 3/1995 | Muth | A47B 53/02 312/198 |
| 5,669,682 | A | * | 9/1997 | Janson | A47B 53/02 188/82.84 |
| 5,683,155 | A | * | 11/1997 | Sarno | A47B 53/00 312/198 |
| 6,112,917 | A | * | 9/2000 | Baker | A47B 53/02 211/162 |
| 6,161,485 | A | * | 12/2000 | Muth | A47B 53/02 104/242 |
| 6,371,031 | B1 | * | 4/2002 | Muth | A47B 53/00 104/242 |
| 7,587,983 | B2 | * | 9/2009 | Parker | A47B 53/02 105/30 |
| 7,645,000 | B2 | * | 1/2010 | Rainville | F16D 63/006 312/201 |
| 9,030,827 | B2 | * | 5/2015 | Jau | A47B 51/00 361/724 |
| 2004/0035060 | A1 | * | 2/2004 | Miyazaki | A47B 53/02 52/29 |
| 2004/0035811 | A1 | * | 2/2004 | Lehmann | G06T 5/002 211/175 |
| 2005/0274268 | A1 | * | 12/2005 | Gottling | B41C 1/05 101/216 |
| 2006/0137204 | A1 | * | 6/2006 | Yang | G01B 7/082 33/832 |
| 2007/0132200 | A1 | * | 6/2007 | Miyazaki | A47B 53/02 280/79.3 |
| 2011/0068663 | A1 | * | 3/2011 | Parker | A47B 53/02 312/201 |
| 2013/0069509 | A1 | * | 3/2013 | Traverso | A47B 53/02 312/249.1 |
| 2018/0325257 | A1 | * | 11/2018 | Xiang | A47B 51/00 |
| 2020/0275774 | A1 | * | 9/2020 | Briosi | A47B 53/02 |

* cited by examiner

MODULAR FRAMEWORK FOR SHELVING

TECHNICAL FIELD

The present invention relates to a modular framework for shelving.

BACKGROUND ART

More in particular, the present invention relates to a framework as defined above, especially adapted to make lightweight shelving of the compactable type, intended for example for paper archives and small-parts warehouses.

As is known, a very strong need exists to allocate the largest quantity of goods in the smallest possible space, i.e. to make the most of the volume available in the room used as a warehouse.

For this purpose, for the storage of finished parts, small parts, spare parts or paper material, compactable warehouses are used, which permit a more rational use of existing space, while at the same time ensuring ample operational flexibility.

These warehouses generally comprise metal shelving fixed on mobile bases, sliding on rails fixed to or recessed in the floor or stabilized on bases resting on the floor.

The reduction of the space occupied by the warehouse is achieved by maintaining a single access aisle suitably created within the block of mobile elements at the loading/unloading front of the stored material.

The aisle can be opened manually by acting on special handles or equivalent gripping parts, mechanically by means of a handwheel connected to a belt movement system or with chain systems, or, in the case of large warehouses, by using a motorized handling system.

Nevertheless, known storage systems have some drawbacks relative to their structural design.

More specifically, the use of chain or belt systems to move the shelving and the consequent opening of the aisle makes the storage systems particularly complex to assemble and involves high installation and maintenance costs.

Moreover, the movement of the shelving by means of chain or belt systems requires the user to apply a significant tensile force which makes access to the shelving, especially if loaded, particularly difficult and inconvenient.

Furthermore, chain or belt systems are particularly noisy when operated to move the shelving.

DESCRIPTION OF THE INVENTION

The main aim of the present invention is to provide a framework which permits creating lightweight structures with limited structural complexity, i.e. which are easy to assemble and which involve low installation and maintenance costs.

Another object of the present invention is to provide a framework which allows the user to move the shelving with the least effort, in a simple and easy way.

Another object of the present invention is to provide a framework which can be moved in a more silent manner than known frameworks.

Another object of the present invention is to devise a framework that allows overcoming the aforementioned drawbacks of the prior art within the scope of a simple, rational, easy, efficient to use and cost-effective solution.

The aforementioned objects are achieved by the present modular framework for shelving having the characteristics of claim 1.

BRIEF DESCRIPTION OF THE DRAWINGS

Other characteristics and advantages of the present invention will be more evident from the description of a preferred, but not exclusive, embodiment of a modular framework for shelving, illustrated by way of an indicative, but non-limiting example, in the attached drawings in which.

EMBODIMENTS OF THE INVENTION

Figure 1:
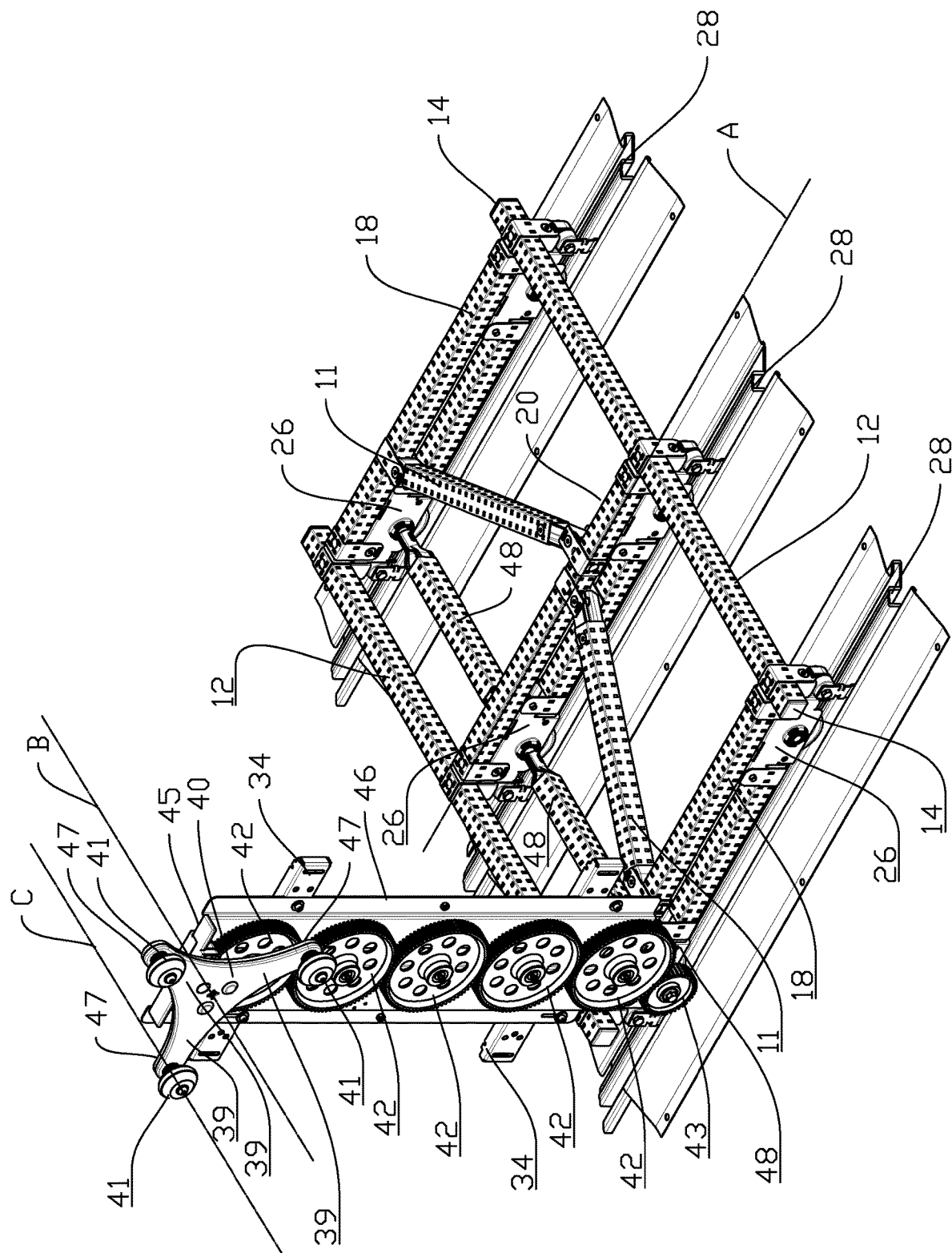
FIG. 1 is an axonometric view of the framework according to the invention.
Figures 2, 3:
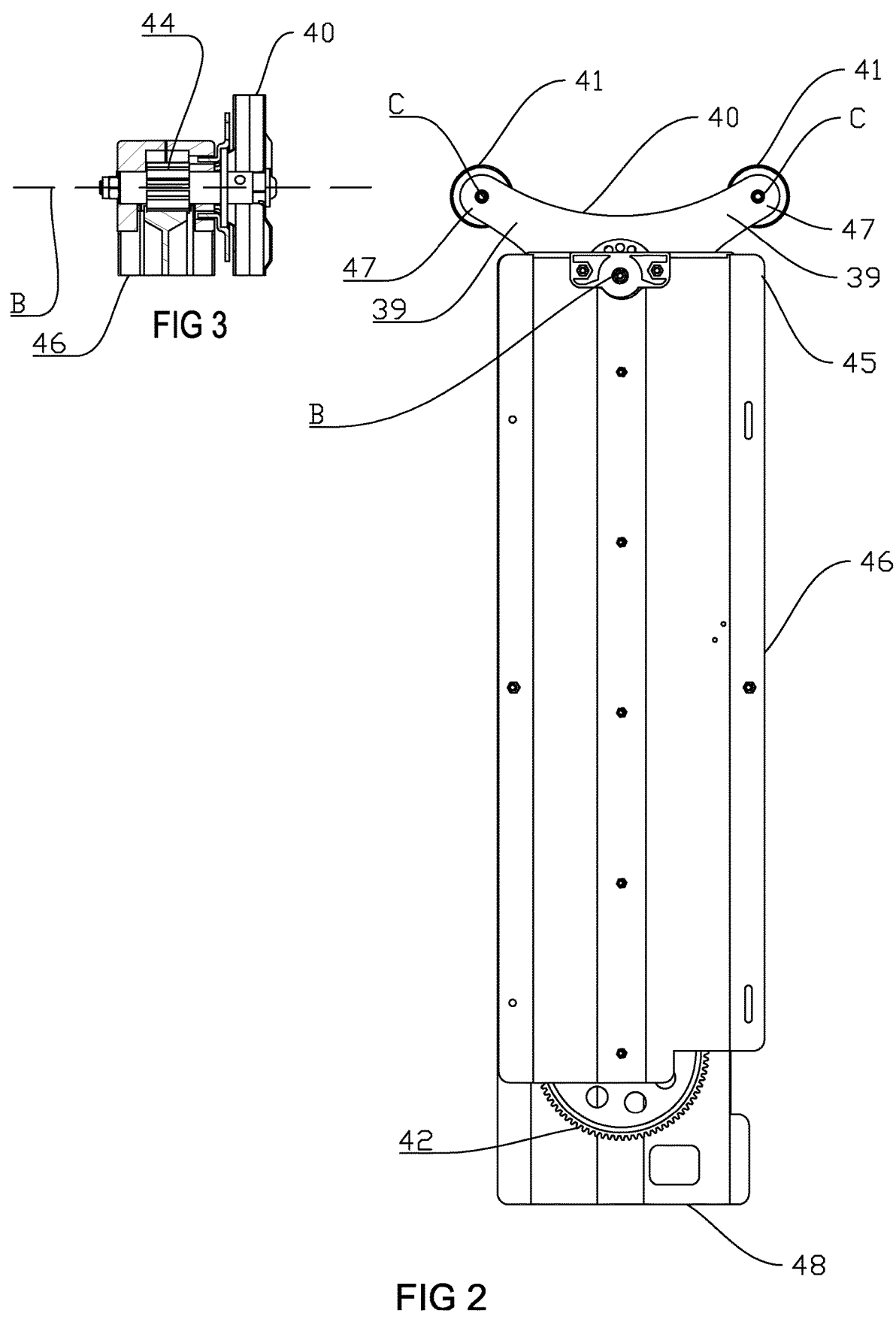
FIG. 2 is a rear view of one element of the framework according to the invention.
FIG. 3 is a sectional view of a detail of FIG. 2.
Figure 4:
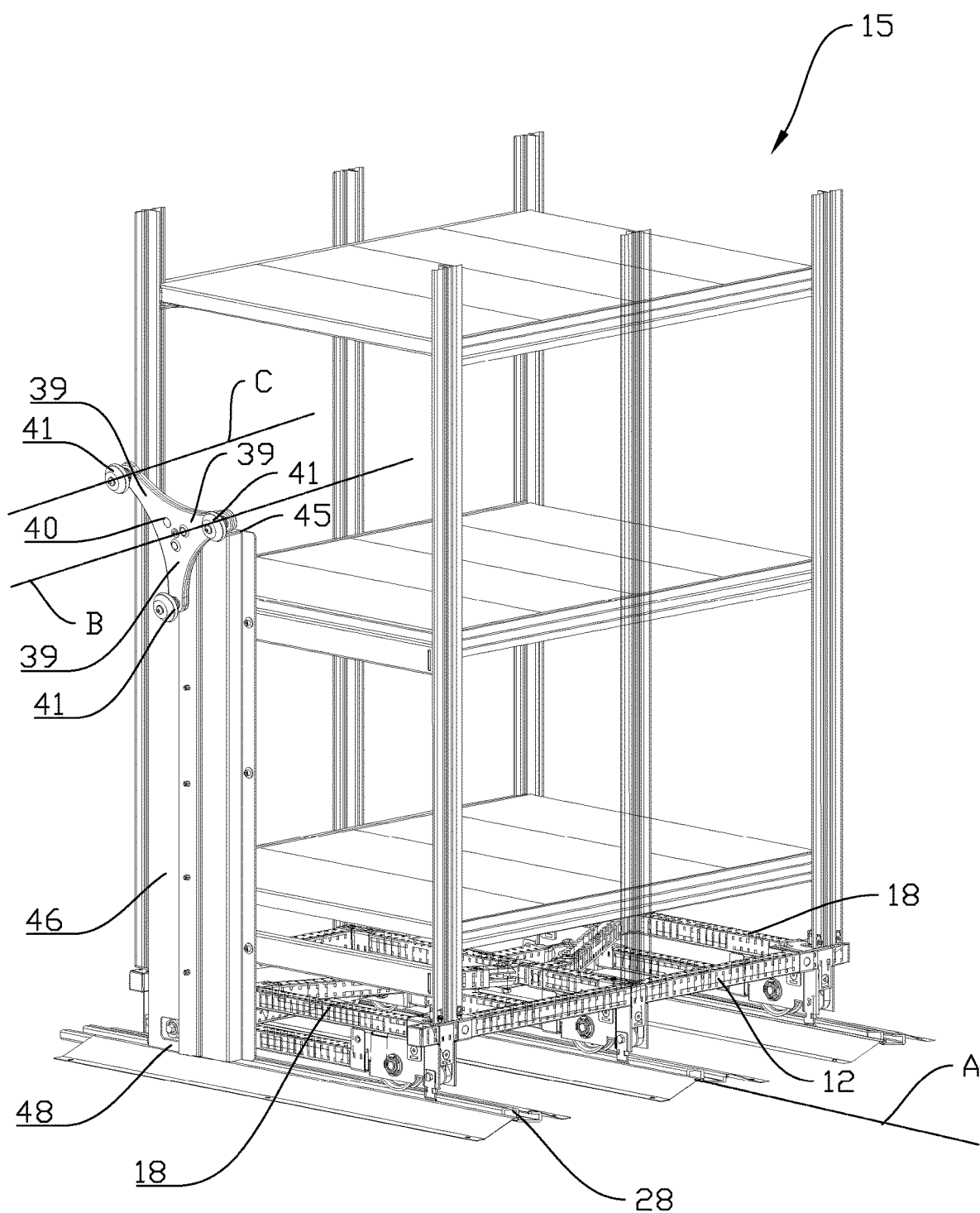
FIG. 4 is an axonometric view of a shelving resting on the framework according to the invention.

With particular reference to these illustrations, reference numeral 1 globally indicates a modular framework for shelving.

The framework 1 comprises:
- at least one supporting frame 10 of at least one shelving 15;
- movement means 26, 48 of the supporting frame 10 for moving it forward/backward on guide means 28 defining a direction of movement A;
- actuating means 40, 41 of the movement means 26, 48 which are associated with the supporting frame 10;
- motion transmission means 42, 43, 44 for transmitting motion from the actuating means 40, 41 to the movement means 26, 48, and associated with the supporting frame 10.

Advantageously, the motion transmission means 42, 43, 44 comprise at least one driving gear wheel 44 associated with the actuating means 40, 41 and at least one driven gear wheel 43 cooperating with the driving gear wheel 44 and associated with the movement means 26, 48.

Furthermore, the driving gear wheel 44 comprises a first plurality of teeth, and the driven gear wheel 43 comprises a second plurality of teeth, the second plurality of teeth being lower than the first plurality of teeth.

This way, the transmission of motion from the driving gear wheel 44 to the driven gear wheel 43 is of the reducing type.

Preferably, the supporting frame 10 comprises at least two rectilinear longitudinal members 12, arranged substantially parallel and opposite to each other, e.g., of the type of steel or other suitable material used for shelving, with a substantially rectangular shape and provided with at least one pair of end portions 14.

Advantageously, the longitudinal members 12 are connected to each other by two opposite cross members 18, positioned at the end portions 14 of the longitudinal members themselves, and by means of at least one intermediate cross member 20.

Preferably, the cross members 18, 20 are fixed to the opposite longitudinal members 12 by means of the connecting means, such as bolts.

Furthermore, the supporting frame 10 comprises reinforcement struts 11 placed between the cross members 18, 20 by means of the connecting means.

Alternative embodiments of the supporting frame 10 cannot however be ruled out, e.g. in which a different number of longitudinal members 12, cross members 18, 20 and struts 11 are used.

In fact, the supporting frame 10 is of the modular type, i.e., by means of the connection means, the longitudinal members 12, the cross members 18, 20 and the struts 11 are associable with each other in different numbers and configurations in order to satisfy different structural requirements, e.g., in terms of supported load or occupied space.

Preferably, the cross members 18, 20 and the struts 11 are made of steel or other suitable material.

Advantageously, the cross members 18, 20 are associated with the movement means 26, 48.

Preferably, the movement means 26, 48 comprise a plurality of movement blocks 26 associated with the cross members 18, 20.

In the embodiment shown in the illustrations, with each of the cross members 18, 20 are associated two movement blocks 26, which comprise at least one containing casing inside which wheels or rollers are housed.

Conveniently, the movement blocks 26 are positioned at the ends of the cross members 18, 20, as shown in FIG. 1.

In particular, the supporting frame 10 is arranged in support on the guide means 28 by means of the wheels of the movement blocks 26.

Furthermore, the movement means 26, 48 also comprise a motion drive shaft 48 associated with a movement block 26 of each cross member 18, 20 so as to be arranged substantially parallel to the longitudinal members 12.

The remaining movement blocks 26 are free, i.e. their wheels are pivoted idly to the supporting frame 10 and free to rotate.

In particular, the shaft 48 is placed between the wheels of the movement blocks 26 with which it is associated and the motion transmission means 42, 43, 44.

Conveniently, the supporting frame 10 comprises at least one containing casing 46 of the motion transmission means 42, 43, 44 arranged substantially orthogonal with respect to the longitudinal members 12 and to the cross members 18, 20, as shown in FIG. 1.

More specifically, the containing casing 46 is made of sheet metal folded and fixed, in a known way, to the shelving 15 by means of a hooking element 34, comprising a metal sheet folded and fixed in a conventional way to the shelving itself.

Preferably, the containing casing 46 is associated with a cross member 18 of the supporting frame 10 at the shaft 48.

With particular reference to FIG. 1, the containing casing 46 comprises an upper extremity 45 at which the driving gear wheel 44 is pivoted and a lower extremity 48 associated with the cross member 18 and at which the driven gear wheel 43 is pivoted.

This way, the driven gear wheel 43 is associated with the shaft 48.

Conveniently, the motion transmission means 42, 43, 44 comprise at least one auxiliary gear wheel 42 interposed between the driving gear wheel 44 and the driven gear wheel 43.

Advantageously, according to the present invention, in order to curb the manufacturing costs and the weight, the gear wheels 42, 43, 44 can also be made of polymer material.

Furthermore, the motion transmission means 42, 43, 44 comprise a plurality of auxiliary gear wheels 42 vertically aligned with each other.

Preferably, the motion transmission means 42, 43, 44 comprise five auxiliary gear wheels 42 cooperating with each other and pivoted inside the containing casing 46 in succession one on top of the other as shown in FIG. 1.

More particularly, the auxiliary gear wheels 42 are suitably spaced away from each other and rotating, respectively, around substantially parallel axes of rotation so as to mesh with each other.

This way, the rotation of the driving gear wheel 44 causes the sequential rotation of the auxiliary gear wheels 42 and of the driven wheel 43.

Consequently, the driven wheel 43 sets in rotation the shaft 48 which activates the movement means 26, 48.

This way, the supporting frame 10, by means of the wheels, makes a shifting forward/backward motion along the guide means 28.

Preferably, the guide means 28 comprise rails equal in number to the cross members 18, 20 and which can be fixed in a conventional manner to the floor or embedded in it.

Appropriately, the activation of the motion transmission means 42, 43, 44, i.e. the rotation of the driving gear wheel 44, takes place through the actuating means 40, 41.

In particular, the actuating means 40, 41 comprise at least one handwheel 40 pivoted onto the supporting frame 10 and coupled to the driving gear wheel 44 by interposition of at least one shaft member, the handwheel 40 and the driving gear wheel 44 being actuatable in rotation around an axis of rotation B.

Preferably, the handwheel 40 is a mechanical steering wheel pivoted on the outside of the containing casing 46 in the proximity of the upper extremity 45.

This way, the shaft element is associated with the driving gear wheel 44.

Furthermore, the handwheel 40 comprises at least one spoke 39 which is arranged substantially orthogonal to the axis of rotation B and defining the radius of the handwheel 40.

Conveniently, the actuating means 40, 41 comprise at least one gripping element 41 pivoted onto the handwheel 40 and rotating around an axis of revolution C substantially parallel to the axis of rotation B.

According to the embodiment shown in the illustrations, the gripping element 41 is a spheroidal knob pivoted idle to the spoke 39 of the handwheel 40.

Preferably, the handwheel 40 comprises three spokes 39 centered at the axis of rotation B so as to form an angle of about 120 degrees to each other.

Moreover, each of the spokes 39 is provided with an end portion 47, at which a corresponding gripping element 41 is pivoted.

Alternative embodiments cannot however be ruled out in which the handwheel 40 comprises a different number of spokes 39, e.g. four spokes 39 spaced away from each other by an angle of about 45 degrees.

Advantageously, the handwheel 40 and the gripping elements 41 allow manual operation of the motion transmission means 42, 43, 44 in order to move the supporting frame 10.

Alternative embodiments cannot however be ruled in which the actuating means 40, 41 comprise an electric motor associated with the driving gear wheel 44 to move the supporting frame 10 in an automated manner.

The operation of the framework 1 is as follows.

In particular, it is noteworthy to describe the operation of the framework 1 with reference to a plurality of frameworks 1 arranged one next to the other in support on common guide means 28 by means of the respective movement means 26, 48, and supporting a corresponding shelving 15.

When the warehouse is closed, the supporting frames 10 are placed side by side at the longitudinal members 12.

As a result, the loading/unloading faces of the relevant shelving 15 are also placed side by side, making the material inaccessible to an operator.

When the need exists to pick up the material, the operator acts on the gripping elements 41 to turn the handwheel 40, which imposes the rotation of the driving gear wheel 44 which transmits the movement in cascade to the auxiliary gear wheels 42, to the driven gear wheel 43 and then to the movement blocks 26 connected to the shaft 48 constrained to the driven gear wheel 43.

This way, the rotational motion of the gear wheels 42, 43, 44 which mesh with each other is converted into a straight shifting motion of the supporting frame 10 along the direction of movement A.

Furthermore, the shift of the supporting frame 10 along the guide means 28 causes the opening of an aisle between two adjacent shelvings 15 and creates the working space required by the operator or, if necessary, by a machine for loading or unloading the material.

Advantageously, the framework 1 comprises locking means for locking the movement means 26, 48 along the direction of movement A.

This way, once the aisle is open, the operator can manually activate the locking means and load or unload the material safely without running the risk of accidental closure of the aisle, e.g., due to an unintentional impact on the shelving 15 or on the handwheel 40, e.g., by another operator.

In particular, the locking means comprise at least one anti-rotation device of the handwheel 40 which is adapted to lock the position of the handwheel 40 into the desired position, preventing the rotation thereof.

Preferably, the anti-rotation device is manually activated/deactivated by the operator.

It has in practice been found that the described invention achieves the intended objects.

In particular, the fact is underlined that the use of the gear wheels significantly reduces the amount of maintenance work required to ensure the proper operation of the framework.

Furthermore, the use of gear wheels makes it possible to reduce the noise level of the framework during its shift compared to known frameworks.

Again, the use of the handwheel in conjunction with the gripping elements allows the operator to easily operate the movement means.

What is more, the number of teeth of the driving gear wheel and the number of teeth of the driven gear wheel achieve a reducing transmission ratio between the actuating means and the movement means so as to facilitate the rotation of the handwheel by the operator.

In addition, the use of longitudinal members and cross members makes it possible to create a modular, lightweight and economical framework able to ensure optimal load distribution.

The invention claimed is:

1. A modular framework for shelving, comprising:
   at least one supporting frame configured to support at least one shelving;
   movement means that is coupled to said supporting frame for moving said supporting frame forward/backward on guide means defining a direction of movement;
   actuating means that are configured to actuate said movement means which are associated with said supporting frame; and
   motion transmission means for transmitting motion from said actuating means to said movement means, and associated with said supporting frame;
   wherein said motion transmission means comprise at least one driving gear wheel associated with said actuating means and at least one driven gear wheel cooperating with said driving gear wheel and associated with said movement means,
   wherein said motion transmission means comprise a plurality of auxiliary gear wheels vertically aligned with each other and interposed between said driving gear wheel and said driven gear wheel,
   wherein multiple of said plurality of auxiliary gear wheels are in direct contact with each other,
   wherein a top of one of said plurality of auxiliary gear wheels is in direct contact with said driving gear wheel, and
   wherein a lower one of said plurality of auxiliary gear wheels is in direct contact with said driven gear wheel.

2. The modular framework according to claim 1, wherein said driving gear wheel comprises a first plurality of teeth, and said driven gear wheel comprises a second plurality of teeth, said second plurality of teeth being lower than said first plurality of teeth.

3. The modular framework according to claim 1, wherein said supporting frame comprises at least one containing casing that houses at least a portion of said motion transmission means.

4. The modular framework according to claim 1, wherein said actuating means comprise at least one handwheel pivoted onto said supporting frame and coupled to said driving gear wheel by interposition of at least one shaft member, said handwheel and said driving gear wheel being actuatable in rotation around an axis of rotation.

5. The modular framework according to claim 4, wherein said actuating means comprise at least one gripping element pivoted onto said handwheel and rotating around an axis of revolution substantially parallel to said axis of rotation.

6. The modular framework according to claim 4, wherein said handwheel comprises at least one spoke which is arranged substantially orthogonal to said axis of rotation and defining the radius of said handwheel.

7. The modular framework according to claim 4, wherein said modular framework comprises locking means for locking said movement means along said direction of movement and said locking means comprise at least one anti-rotation device of said handwheel.

8. The modular framework according to claim 1, wherein said framework comprises locking means for locking said movement means along said direction of movement.

* * * * *